United States Patent
Richter et al.

(10) Patent No.: US 8,959,936 B2
(45) Date of Patent: Feb. 24, 2015

(54) METHOD FOR OPERATION OF AN HVAC SYSTEM

(75) Inventors: Gerald Richter, Aachen (DE); Tobias Haas, Cologne (DE); Marc Graaf, Krefeld (DE)

(73) Assignee: Halla Visteon Climate Control Corporation, Daejeon-si (KR)

( * ) Notice: Subject to any disclaimer, the term of this patent is extended or adjusted under 35 U.S.C. 154(b) by 1074 days.

(21) Appl. No.: 13/008,079

(22) Filed: Jan. 18, 2011

(65) Prior Publication Data

US 2011/0174000 A1      Jul. 21, 2011

(30) Foreign Application Priority Data

Jan. 19, 2010   (DE) .......................... 10 2010 000 990

(51) Int. Cl.
  *F25D 17/06*       (2006.01)
  *B60H 1/00*        (2006.01)

(52) U.S. Cl.
  CPC ........ *B60H 1/00921* (2013.01); *B60H 1/00064* (2013.01); *B60H 2001/00092* (2013.01); *B60H 2001/00164* (2013.01); *B60H 2001/00928* (2013.01); *B60H 2001/00949* (2013.01)
  USPC ................................................ 62/93; 62/224

(58) Field of Classification Search
  CPC ................. B60H 1/00064; B60H 2001/00949; B60H 2001/00928; B60H 1/00921; B60H 2001/00164; B60H 2001/00092
  USPC ....................................... 62/244, 89, 93, 335
  See application file for complete search history.

(56) References Cited

U.S. PATENT DOCUMENTS

| | | | |
|---|---|---|---|
| 4,625,911 | A | 12/1986 | Tomita |
| 5,280,852 | A | 1/1994 | Dauvergne |
| 5,291,941 | A | 3/1994 | Enomoto et al. |
| 5,390,508 | A | 2/1995 | Benedict |
| 6,118,099 | A | 9/2000 | Lake et al. |
| 6,662,579 | B2 | 12/2003 | Takano et al. |

(Continued)

FOREIGN PATENT DOCUMENTS

| | | |
|---|---|---|
| DE | 4238264 A1 | 5/1994 |
| DE | 10138101 A1 | 11/2002 |

(Continued)

OTHER PUBLICATIONS

Translation of DE 10147114 to Alexander et al.*

*Primary Examiner* — Mohammad M Ali
(74) *Attorney, Agent, or Firm* — Fraser Clemens Martin & Miller LLC; James D. Miller

(57) ABSTRACT

A method for operating an HVAC system includes the steps of adjusting a heating temperature of a heat exchanger disposed in a first flow passage, directing a first partial air mass flow through the first flow passage, directing a second partial air mass flow through a second flow passage, and directing the first partial air mass flow and the second partial air mass flow downstream of the first flow passage and the second flow passage, wherein the heating temperature of the heat exchanger required to at least one of achieve and maintain a desired climate in the passenger compartment of the vehicle is set as a maximum heating temperature for the heat exchanger, and wherein only an amount of energy required to at least one of achieve and maintain a desired climate in the passenger compartment of the vehicle is added to the HVAC system.

15 Claims, 3 Drawing Sheets

(56) References Cited

U.S. PATENT DOCUMENTS

| | | |
|---|---|---|
| 6,810,952 B2 | 11/2004 | Fredj et al. |
| 6,913,067 B2 | 7/2005 | Hesse |
| 7,325,595 B2 | 2/2008 | Homan et al. |
| 7,380,586 B2 | 6/2008 | Gawthrop |
| 7,607,313 B2 | 10/2009 | Stanke et al. |
| 2002/0023442 A1 | 2/2002 | Arita et al. |
| 2005/0035657 A1* | 2/2005 | Brummett et al. ............ 307/10.1 |
| 2008/0006045 A1* | 1/2008 | Brummett ....................... 62/236 |
| 2008/0245504 A1* | 10/2008 | Eisenhour ....................... 165/43 |
| 2009/0205353 A1* | 8/2009 | Takahashi ..................... 62/324.1 |

FOREIGN PATENT DOCUMENTS

| | | |
|---|---|---|
| DE | 102004039852 A1 | 3/2005 |
| DE | 10147114 B4 | 11/2005 |
| EP | 1522438 A1 | 4/2005 |
| EP | 1524139 A1 | 4/2005 |
| EP | 1535769 A2 | 6/2005 |

* cited by examiner

METHOD FOR OPERATION OF AN HVAC SYSTEM

CROSS-REFERENCE TO RELATED APPLICATION

This application claims priority to German Patent Application Serial Number DE 10 2010 000 990.3 filed Jan. 19, 2010, the entire disclosure of which is hereby incorporated herein by reference.

FIELD OF THE INVENTION

The invention relates to a method for the operation of an HVAC (heating, ventilation, and air conditioning) system for vehicles.

BACKGROUND OF THE INVENTION

Typically, air to be supplied to a passenger compartment is conditioned using HVAC (heating, ventilation, and air conditioning) systems equipped with a refrigeration system for cooling the air and a coolant/air heat exchanger of an engine cooling circuit for heating the air. Additionally, conventional HVAC systems typically include air/air heat pumps and/or coolant/air heat pumps.

In HVAC systems including a coolant/air heat exchanger, the system obtains heat from a cooling circuit of an internal combustion engine of the vehicle drive and conducts heat into the passenger compartment. The heat loss of efficient internal combustion engines is not sufficient at low ambient temperatures to heat a coolant to a temperature level required for comfortably heating the passenger compartment. The temperature level of the coolant, hence the heat flow into the air to be supplied to the passenger compartment, additionally depends on the operating conditions of the vehicle drive (e.g. running conditions of the vehicle such as the rotational speed and the load conditions of the engine).

Heat is delivered from the coolant to the air to be conditioned by means of a heating heat exchanger of the HVAC system. The transferred heat is adjusted either by controlling the air mass flow passing the heating heat exchanger or by controlling the coolant mass flow by-passing the heating heat exchanger.

Currently, in state-of-the art, two main types of HVAC systems are known.

The first type of HVAC system includes air flow controlled systems, wherein the air mass flow to be supplied to the passenger compartment is split into two partial air mass flows using a door. One of the partial air mass flows is directed through the heating heat exchanger and heated. The second partial air mass flow concurrently bypasses the heating heat exchanger. Both differently tempered partial air mass flows are then mixed in order to reach the required target temperature. However, mixing of the partial air mass flows is not optimum. At intermediate positions of the temperature door the air mass flows entering the passenger compartment through the various air outlets have different temperatures. The difference of the temperatures of the air flows at the various air outlets is known as thermal stratification. In certain situations, thermal stratification is desired such as providing a warm footwell and cooler headspace of a passenger compartment, else the comfort of the passengers would distinctly be reduced. Generally, the stratification depends on the position of the temperature door. In a "fully warm" position, all air flows passing through the outlets into the passenger compartment have the same temperatures so that there is no stratification.

As an example, such an HVAC system is disclosed in DE 10 2004 039 852 A1. The HVAC system includes a heating device for heating the air to be supplied to the passenger compartment. The heating device is supplied by a heating medium, which in turn is heated by a heating source. Using an air mixing door the air mass flow is directed through the heating device and/or bypasses the heating device. The air channel is equipped with a face outlet and a foot outlet.

The second type of HVAC system includes a coolant systems controlled on the coolant-flow side. In such systems, a coolant mass flow is controlled using a valve in such a way that the transferred heat is adjustable in proportion to the coolant mass flow for a given temperature. Depending on the kind of the heat exchanger, undesired thermal stratifications over the surface of the heating heat exchanger may result. In addition, the discontinuities of the coolant mass flow due to varying engine speeds produce other unintended effects.

In both different modes of operation of the HVAC systems (i.e. the air side- and the coolant side-controlled systems), the heat that is not transferred in the heating heat exchanger to the air to be conditioned (i.e. the unused heat) is transported as hot coolant to the vehicle radiator and dissipated to the environment. In vehicles that are traditionally engine driven, a relatively large amount of heat is dissipated to the ambient air in form of waste heat.

Further, in coolant side-controlled systems the varying coolant mass flow, as well as the varying coolant temperature, cause energetic losses, particularly when, due to timing, the coolant mass flow passing the heating heat exchanger is reduced.

Against the background of complete electrification of the drive or, respectively, the increasing use of vehicle drive systems with very little waste heat, such as electric drives, fuel cell drives, or hybrid drives, the heat available in the coolant for conditioning the air to be supplied to the passenger compartment will be markedly limited due to the higher efficiencies of the drive components.

At the same time, the amount of energy that is storable in the battery of the vehicle today is less than that storable in form of liquid fuel in the fuel tank. Accordingly, the power required for the air conditioning of the passenger compartment of an electrically or partial-electrically driven vehicle also significantly influences the range of the vehicle.

Therefore, energy losses caused by admixing cold air or dissipating heat to the environment in the radiator should be avoided.

Further, in electrically or partial-electrically driven vehicles, due to the little amount of available waste heat of the drive components, the temperature level of the coolant compared with traditional engine drives are clearly lower. An air side-controlled HVAC system, therefore, is preferably operated at the "fully warm" position of the temperature door so that no temperature stratification of the air flows at the outlets develops. However, the comfort of the passengers is distinctly reduced.

Coolant/air heat pumps known in prior art also use the coolant of the engine as heat source, whereby heat is extracted from the coolant. Therefore the engine is operated at low temperatures over prolonged periods, which negatively affects the exhaust gas emissions and fuel consumption. Due to the intermittent operation of the engine in hybrid vehicles, a sufficiently high coolant temperature will not be reached on longer rides. Therefore, at low ambient temperatures the start/stop operation of the engine is interrupted, wherein the engine is not switched off.

In electrically or partial-electrically driven vehicles, the electric drive has high efficiencies at low temperatures so that the drive is operated at a low temperature level, as compared with the engine. Also, the batteries, especially lithium ion batteries, have low temperatures of 40° C. maximum, which are not sufficient to directly air condition the passenger compartment, but are suitable to be a heat source for a coolant/air heat pump.

Against the background of the systems known in prior art, it is necessary to additionally use concepts of auxiliary heating in the HVAC system.

It is desirable to provide a method for the control of an efficient HVAC system that, independent of the operational conditions of the vehicle drive, (i.e. the running conditions of the vehicle), ensures a temperature stratification, as required for reaching and maintaining comfort, of the air mass flow to be supplied to the passenger compartment and provides a necessary heat as needed.

SUMMARY OF THE INVENTION

According to the invention, the shortcomings of the prior art are overcome by a method for operating an HVAC system, which, for conditioning the air for a passenger compartment of a vehicle, includes an air channel having a main flow passage and a bypass and a plurality of air guide members. Additionally, a stratification door is placed inside the bypass and a heat exchanger is placed in the main flow passage.

In one embodiment, a method for operating an HVAC system for conditioning air for a passenger compartment of a vehicle, the method comprising the steps of: adjusting a heating temperature of a heat exchanger disposed in a first flow passage; directing a first partial air mass flow through the first flow passage; directing a second partial air mass flow through a second flow passage by means of a position of a stratification door, the second flow passage bypassing the heat exchanger; and directing the first partial air mass flow and the second partial air mass flow by means of an air guide member as total flow with stratified composition, the air guide member disposed downstream of the first flow passage and the second flow passage, wherein the heating temperature of the heat exchanger required to at least one of achieve and maintain a desired climate in the passenger compartment of the vehicle is set as a maximum heating temperature for the heat exchanger, and wherein only an amount of energy required to at least one of achieve and maintain a desired climate in the passenger compartment of the vehicle is added to the HVAC system.

According to the invention, first, only an amount of energy is added to the HVAC system that is needed for reaching or maintaining the comfort of the climate in the passenger compartment. Energy losses, especially the heat dissipated to the ambient air, are minimized or, respectively, the energy demand of the HVAC system is optimized, thus extending the range, for example, of an electrically or partial-electrically driven vehicle. Hereby a distinction needs to be made between various forms of energy. For example, either heat or/and electrical energy is delivered to the HVAC system, with the electrical energy also transferred to the air to be conditioned for the passenger compartment as energy in form of heat. The heat is transferred at a defined temperature level that, for example, depends on the components of the HVAC system and external conditions.

Second, the heating temperature of the heat exchanger is set as a maximum temperature that corresponds to the temperature needed for reaching or maintaining comfort at the respective point in time. The heating temperature, in turn, determines the temperature of a heating surface of the heat exchanger, from which the heat is transferred to the air. The temperature required, or the maximum temperature of the heat exchanger, respectively, depends on the air temperature desired in the passenger compartment, that is the maximum of the desired temperature in the stratified total flow of the air in the air channel.

The air channel of the HVAC system is divided into a main flow passage and a bypass. The method of the invention includes the directing of a first partial air mass flow through the main flow passage and the heat exchanger placed therein, and of a second partial air mass flow through the bypass past the heat exchanger. The air mass flow is divided by controlling the stratification door that is located in the bypass.

The partial air mass flows, which are separately directed through the main flow passage and the bypass are, after having passed through the main flow passage and the bypass, advantageously guided in the air channel by means of the air guide members as total flow with stratified composition. A stratified flow, or a stratified composition of the conditioned air mass flow, respectively, is meant to be an air mass flow with varying temperatures at right angles to the direction of flow of the air. Therefore, the air mass flow has different temperatures over the cross-section of the air channel. Mixing of the differently tempered air masses in the air mass flow is minimized by specific guiding with the air guide members.

To a preferred embodiment of the invention the air to be conditioned is cooled and/or dehumidified in an evaporator of a refrigerant circuit, the evaporator being placed in the air channel in direction of flow of the air upstream of the point of division of the air flow into the partial air mass flows through the main flow passage and the bypass.

The refrigerant circuit, including the evaporator, is a circuit of an HVAC system which can be established for a combined refrigeration and/or heat pump operation as well as for an after-heating operation.

After cooling and/or dehumidifying of the air to be conditioned in the evaporator the air can be heated in the heat exchanger that is placed inside the main flow passage.

According to the invention the actually required heating temperature of the heat exchanger is adjusted as maximum temperature. Only the energy is additionally delivered to the HVAC system that is needed for reaching or maintaining the comfort of the climate in the passenger compartment.

The heat exchanger that is placed inside the main flow passage is preferably established as media-passed heat exchanger. According to an alternative embodiment the heat exchanger is electrically operated. The term media-passed relates to the heat-delivering side of the heat exchanger, which is preferably provided for heating the air as the medium to be heated on the other side of the heat exchanger.

In the embodiment of the heat exchanger that is placed inside the main flow passage as a media-passed heat exchanger, the maximum temperature depends on the mass flow of the heating medium and the air mass flow to be conditioned and relates to the temperature of the heating medium when entering into the heat exchanger. The maximum temperature is further controlled depending on the terminal temperature difference in respect to the cooling of the heating medium and the heating of the air. The maximum required temperature of the heating medium at the entry into the heat exchanger is determined depending on the rate of the air mass flow and the mass flow of the heating medium as well as the temperature of the air required at the outlet of the heat exchanger and the terminal temperature difference of the heat exchanger. The specific control of the heat delivered to the air and the heating medium optimizes the energy demand of the HVAC system.

According to another embodiment of the invention, the heat exchanger placed in the main flow passage is preferably established as a heating heat exchanger of a closed cooling circuit and is provided to deliver heat from the cooling medium, such as glycol, to the air to be conditioned. In this way, the first partial air mass flow that passes the main flow passage of the air channel, there being directed through the heat exchanger is heated. That means that the heat exchanger is a medium-passed heat exchanger.

The coolant circuit is provided with additional heat exchangers, namely an engine radiator, an auxiliary heater and a radiator with bypass and control valve, for heat absorption and heat delivery by the coolant as heating medium, these additional heat exchangers also provided for adjusting the coolant temperature when entering the heating heat exchanger, i.e. the heating temperature. The radiator is also known as vehicle radiator. The term coolant relates to the original function of the circuit, namely cooling the drive components such as the engine. Utilization of the heat dissipated by the drive components for heating the air to be supplied to the passenger compartment results in the term heating medium. Therefore, the coolant circulated in the cooling circuit corresponds to the heating medium.

Depending on the heat demand in the heating heat exchanger and the heat in the engine radiator introduced into the cooling circuit, heat is advantageously supplied to the coolant in the auxiliary heater and/or removed from the coolant in the radiator. Heat dissipation in the radiator is controlled by means of the control valve and the division of the coolant mass flow into flows through the radiator and the bypass parallel to the radiator.

If in the engine radiator heat is transferred to the coolant in such an amount that no additional heat is needed in the heating heat exchanger for delivering the required heat to the air to be conditioned, no additional heat is delivered to the coolant in the auxiliary heater. The surplus heat transferred from the drive components such as the engine radiator to the coolant is dissipated to the ambient air in the radiator.

The preferably electrically operated auxiliary heater can here be established either as a separate component in the cooling circuit, be integrated into another component such as the heating heat exchanger, or be arranged in the air flow as additional component downstream, in direction of the air flow, of the heating heat exchanger.

The cooling circuit is, further, advantageously provided with a control valve and a bypass running past the heating heat exchanger. According to a further preferred embodiment of the invention the heat to be delivered in the heating heat exchanger from the heating medium to the air to be conditioned is controlled by dividing the mass flow of the heating medium into flows through the bypass and the heating heat exchanger.

It is advantageous if the heating heat exchanger is established as cross-counterflow heat exchanger, thus as highly efficient heat exchanger that maximizes temperature gradients between the supplied and removed coolant mass flows.

An advantageous embodiment of the invention is that the first partial air mass flow that passes the main flow passage of the air channel is directed through the heat exchanger by means of a position of a temperature door arranged upstream of the heat exchanger in the main flow passage. The temperature door is preferably placed inside the main flow passage of the air channel.

The temperature door is only to be operated in the end positions (e.g. "fully cold" and "fully warm") so that a special, expensive control concept and costly components for the control of the temperature door are not needed. The temperature door can be put in either position using a simple servo motor. In the "fully warm" end position of the temperature door, the position of the stratification door in the bypass of the air channel past the heating heat exchanger is controlled. In the "fully warm" end position of the temperature door, the first partial air mass flow is directed through the heating heat exchanger. In the "fully cold" end position the first partial air mass flow is directed past the heating heat exchanger. During operation of the temperature door in the "fully cold" end position, no heat is delivered to the air mass flow that has been cooled and/or dehumidifed before in the evaporator of the refrigerant circuit. At the same time, no heat is dissipated in the heating heat exchanger. Under external conditions corresponding with this operational condition, such as high outside temperatures and hence air cooling needed, the control valve and the bypass past the heating heat exchanger in the coolant circuit can be dispensed with.

The state variables of the air in the passenger compartment and in the air channel of the HVAC system are determined and preferably transmitted to a control unit. The control unit evaluates the received signals and transmits signals to control elements for controlling the heat transfer to the heating medium in the auxiliary heater, the positions of the control valves and thus the opening and closing of the bypasses past the radiator and the heating heat exchanger and the position of the stratification door and the temperature door.

Therefore, this method is not only a method for operating, but also a method for controlling the HVAC system. The method for the operation includes the control method.

According to another embodiment of the invention the heat exchanger for heating the air to be supplied to the passenger compartment is established as a condenser of the closed refrigerant circuit. The first partial air mass flow is therefore directed through the condenser and heated. As refrigerant passes the heat dissipating side of the heat exchanger, this embodiment is a media-passed heat exchanger.

The heat delivered by the refrigerant to the air mass flow in the condenser is preferably controlled over the rotational speed of a compressor in the refrigerant circuit and/or the position of the stratification door in the bypass of the air channel, that is in the air mass flow through the condenser.

Again the state variables of the air in the passenger compartment and in the air channel of the HVAC system are determined and transmitted to a control unit. The control unit evaluates the received signals and transmits signals to control elements for the control of the rotational speed of the compressor in the refrigerant circuit and the position of the stratification door. A temperature door in direction of flow of the air upstream of the condenser in the air channel, like when the heating heat exchanger is used, is not necessary.

In addition, the partial air mass flows that are directed separately through the main flow passage and the bypass can be partially mixed after passing the passage and the bypass, whereby at least a portion of the partial air mass flow that passed through the bypass is mixed with a portion of the partial air mass flow that passed through the main flow passage, and the total flow of the air to be conditioned is directed with distinctly stratified composition by means of the air guide members in the air channel. The total flow of the air may, for example, comprise the following layers: unmixed layers of the partial air mass flows after passing the passage and the bypass; unmixed layers of the partial air mass flows after passing the passage and the bypass with a layer placed in between of partially mixed air masses of the mentioned partial air mass flows; or layer of mixed air masses of the partial air mass flow that passed through the bypass with portion of the partial air mass flow that passed through the main flow passage and layer of the partial air mass flow after passing the main flow passage.

The partial air mass flows are preferably mixed only after the outflow from the HVAC system so that the partial air mass flows remain unmixed up to the respective outlet, only mixing in the air guides downstream of the HVAC system.

The advantages of the method according to the invention can be summarized as follows: Only that heat is delivered to the HVAC system that is needed to air condition the passenger compartment; the heat is provided at the temperature level required for reaching or maintaining the comfort, thus optimizing the exergetic degree of utilization of the HVAC system; the energy demand of the HVAC system can be optimized by specific control of the heat, thereby significantly increasing the range of the vehicle; the stratification of the air mass flow in the air channel is independent of the operational state of the HVAC system. So the comfort of the passengers can be ensured at any point in time; the HVAC system is designable compact; and due to the operation only in two end positions, the temperature door can be actuated by a simple servo motor.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
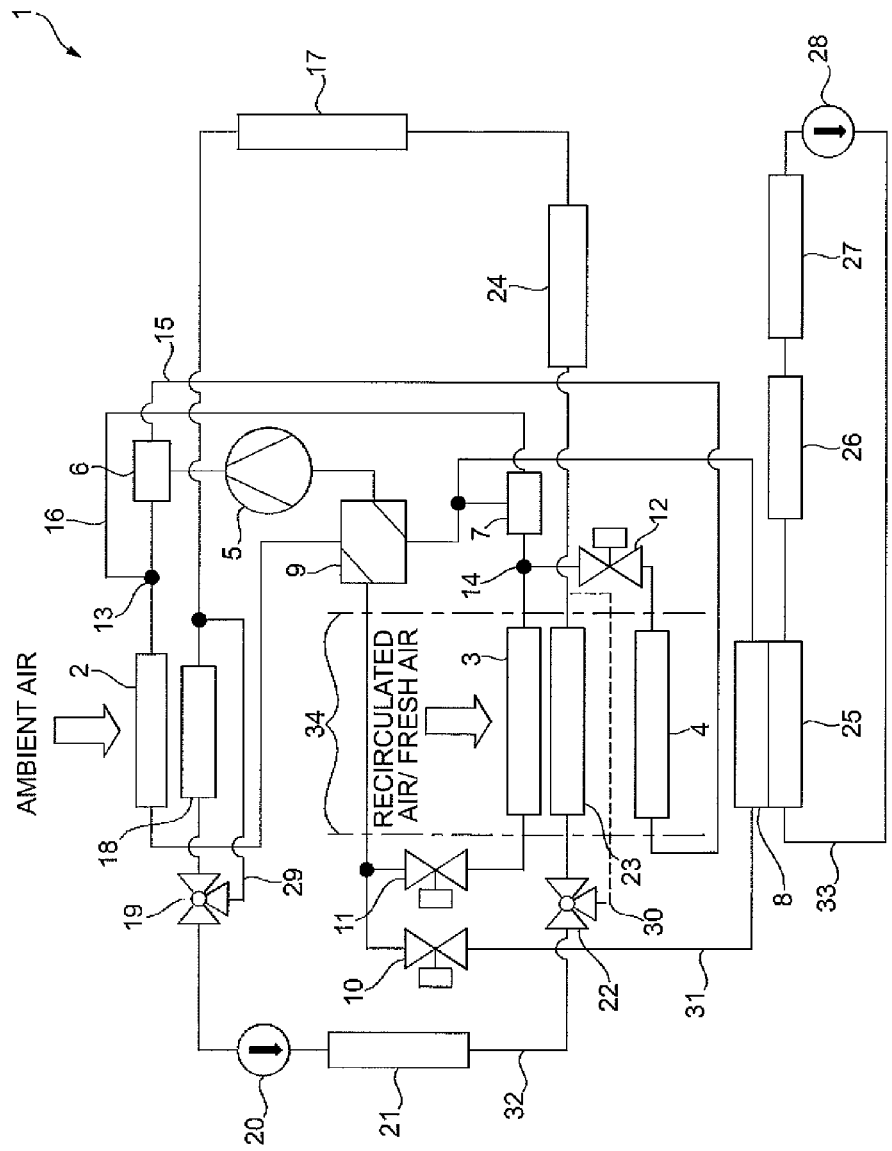
FIG. 1 is a schematic representation of an HVAC system according to an embodiment of the present invention, the HVAC system shown with a refrigerant circuit and a coolant circuit for a plurality of drive components and a shut-off valve disposed upstream of a heating heat exchanger.

In FIG. 1 the HVAC system 1 with a refrigerant circuit 31 and two coolant circuits 32, 33 is shown.

Within the refrigerant circuit 31, in a direction of flow one after the other, an evaporator 3, a compressor 5, a condenser 2, and an expansion device 11 are provided. The components 2, 3, 5 are connected through a plurality of refrigerant conduits to form a closed primary circuit. Further, an inner heat exchanger 9 is optionally integrated into the primary circuit, the inner heat exchanger 9 serving to transfer heat between a liquid refrigerant at high pressure and a gaseous refrigerant at low pressure. The term inner heat exchanger here relates to the arrangement and the heat transfer inside the refrigerant circuit 31. Apart from undesired heat losses or heat inputs, no heat is dissipated to the external ambience or taken therefrom.

Optionally, a second evaporator 8 is integrated in the refrigerant circuit 31 upstream from the expansion device 10 (e.g. as a chiller of a coolant circuit 33 for battery cooling). In certain embodiments, a battery is connected over an intermediate circuit with a coolant to the refrigerant circuit 31. The coolant, such as glycol, is circulated in the coolant circuit 33 using a pump 28. The heat is absorbed in a battery cooler 27 and/or a auxiliary heater 26 and is transferred from the coolant to the refrigerant in a heat exchanger 25, which at the same time can be the second evaporator 8 of the refrigerant circuit 31.

For the switchable refrigeration system/heat pump operation the refrigerant circuit 31 is, in addition to the primary circuit, provided with a secondary branch consisting of two flow paths 15, 16 so that the HVAC system 1 can be operated for cooling and heating the air to be supplied to the passenger compartment.

For heating by means of the refrigerant circuit 31, in addition to the components of the primary circuit, an actively controlled switching valve and a second condenser 4 at the tapping point 6 and a valve at an entering point 7, are provided. At low ambient temperatures, the passenger compartment is to be heated using the HVAC system 1. Heating can be performed, for example, using the refrigerant circuit 31 operated in heating mode or heat pump mode, respectively. When doing so, the active switching valve at the tapping point 6 is controlled such that the refrigerant mass flow downstream of the compressor 5 is conducted over the second condenser 4 with a downstream expansion device 12 to the entering point 7 and the evaporator 3. In the condenser 4, heat from the refrigerant is delivered to the air to be supplied to the passenger compartment. The expansion device 12 allows the evaporator 3 in heat pump operation to be controllable to a medium pressure level between the heat delivering level in the condenser 4 and the heat absorbing level in the heat exchanger 2. In the heat exchanger 2, the refrigerant absorbs heat from the environment. The refrigerant mass flow is then directed to the compressor 5 over a tapping point 13 and the valve at the entering point 7 so that the refrigerant circuit 31 is closed. The valve at the entering point 7, as a passive valve, can be designed such that a side with the higher pressure is closed by the pressure differential over the valve.

For heating the air to be supplied to the passenger compartment at lower ambient temperatures or for reheating the air after cooling for dehumidifying, according to the embodiment of the invention as to FIG. 1, a heating heat exchanger 23 of the coolant circuit 32 of the engine is additionally provided. Here the heating heat exchanger 23 is placed, as is the second condenser 4 of the coolant circuit 31, in the air channel 34 downstream of the evaporator 3 in a direction of a flow of the air. According to an alternative embodiment not shown, an electrically operated heat exchanger can also be provided for heating the air.

The coolant circuit 32 of the engine includes, apart from the heating heat exchanger 23 of the HVAC system 1, other heat exchangers 17, 24 for dissipating heat losses of the engine and the inverter. The coolant, such as glycol, circulated by a pump 20, thus absorbs heat in the heat exchanger 24 of the inverter and in the heat exchanger 17 of the engine and is heated. Depending on the state of the air to be supplied to the passenger compartment and the operating conditions of the vehicle drive (e.g. the running conditions such as the rotational speed and the load conditions of the engine) and thus on the heat dissipated from the engine or the inverter to the coolant, the heat available in the coolant differs from the heat necessarily to be transferred to the air for a comfortable heating of the passenger compartment. For controllably delivering heat from the coolant to the air to be supplied to the passenger compartment in the heating heat exchanger 23, while at the same time ensuring cooling the engine and inverter, the HVAC system 1, especially the coolant circuit 32, is provided with additional heat exchangers in form of an auxiliary heater 21 and a radiator 18. The auxiliary heater 21 supplies additional heat to the coolant when the amounts of heat from the heat sources (e.g. engine and inverter) are not sufficient. The heat transfer in the auxiliary heater 21 is controlled to pre-given parameters. In this case, electrical energy is changed into heat.

In operating conditions when more heat is delivered from the drive components than needed for heating the air to be supplied to the passenger compartment, the surplus heat is dissipated to the ambience over the radiator 18. A bypass 29 is provided for the control of the coolant mass flow through the radiator 18, thus the heat to be dissipated. Therefore, the mass flow is advantageously splittable into two partial mass flows with one partial mass flow passing the radiator 18 and the second partial mass flow passing the bypass 29. The coolant flow rates, or the partial mass flows, are adjustable with the switch-off valve 19. The switch-off valve 19, established as three-way valve, is designed to be controllable. Alternatively, the dissipated heat could also be controlled on the air side by varying the air mass flow passing the radiator 18.

With the HVAC system 1 in FIG. 1, the heat to be transferred in the heating heat exchanger 23 from the coolant to the air to be supplied to the passenger compartment is also advantageously controlled over the flow rate of the coolant. In the same way as the radiator 18, the coolant mass flow is split by means of a bypass 30 and a switch-off valve 22 into two partial mass flows, with one partial mass flow passing (i.e. passing through, passing adjacent to) the heating heat exchanger 23, the second partial mass flow passing the bypass 30 and being directed to bypass the heating heat exchanger 23. The partial mass flows are adjustable using the switch-off valve 22 that is established as three-way valve. The heating heat exchanger 23 is established as highly efficient heat exchanger, which allows large temperature gradients between the supplied and removed coolant mass flows.

The air temperature required for air conditioning the passenger compartment is measured, evaluated using a control unit and appropriately controlled over the auxiliary heater 21 and the switch-off valves 19, 22 combined with the partial mass flows past radiator 18 and/or heating heat exchanger 23. Thus, by use of the bypasses 29, 30 the coolant flow rates through the radiator 18 and the heating heat exchanger 23, and thereby the temperature of the coolant, are controlled depending on the required outputs. Particularly advantageous in this embodiment of the invention, is that the coolant, first, is circulated by the pump 20 and split by the switch-off valves 19, 22 such that the coolant mass flow is continuously controllable.

In this way, advantageously a medium is provided, the mass flow and temperature of which are controlled such that only the heat needed to reach the required climate in the passenger compartment in addition to the present level is delivered into the medium.

Figure 2:
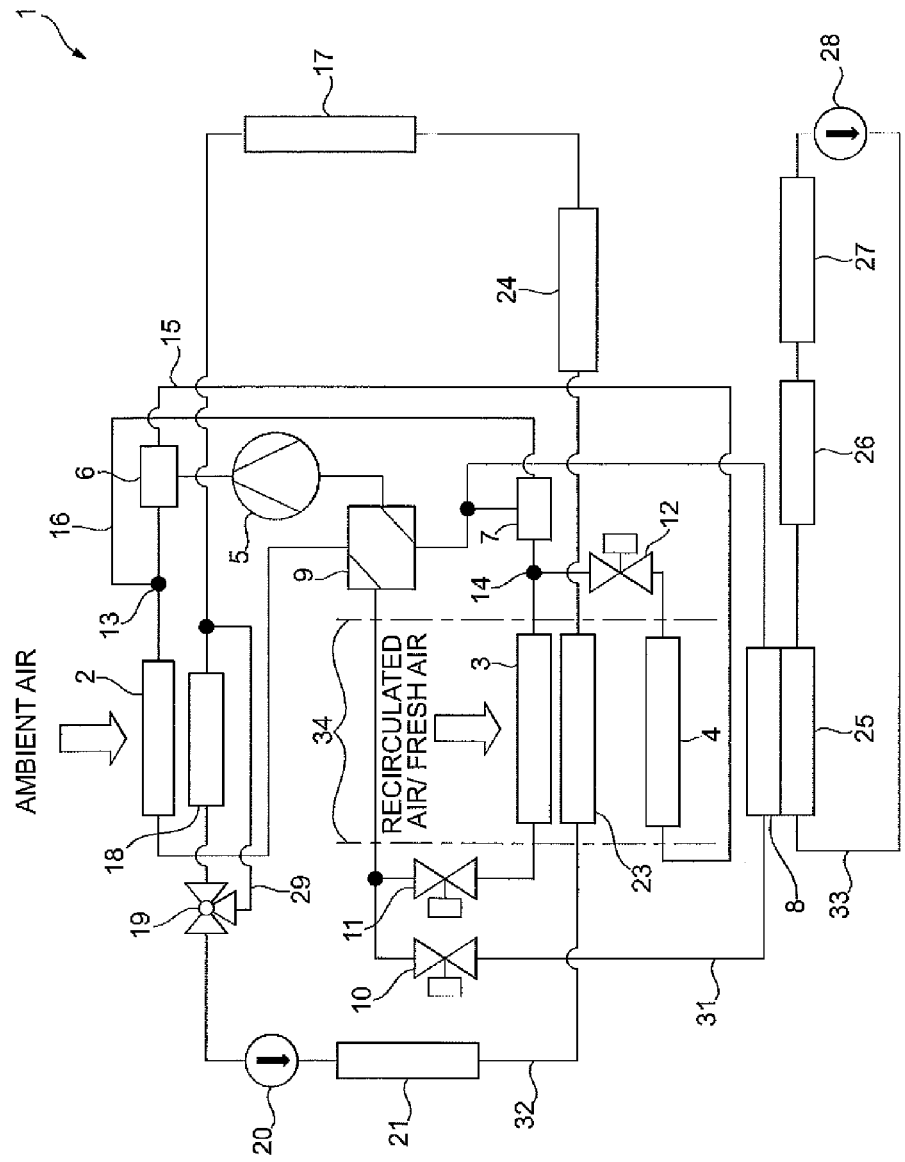
FIG. 2 is a schematic representation of an HVAC system according to another embodiment of the present invention, the HVAC system shown without a shut-off valve upstream of the heating heat exchanger.

Further, instead of the coolant-side control of the heating heat exchanger 23, there is the possibility of air-side control, with the air mass flow to be supplied to the passenger compartment through the heating heat exchanger 23. In this case, as is shown in FIG. 2, the HVAC system 1 is established with the refrigerant circuit 31 and the coolant circuit 32 of the drive components engine and an inverter without the switch-off valve 22 and the bypass 30 past the heating heat exchanger 23.

Further, the HVAC system 1 advantageously includes means to adjust temperatures of individual outlets into the passenger compartment in order to achieve required temperature stratifications of the air mass flow.

Figure 3:
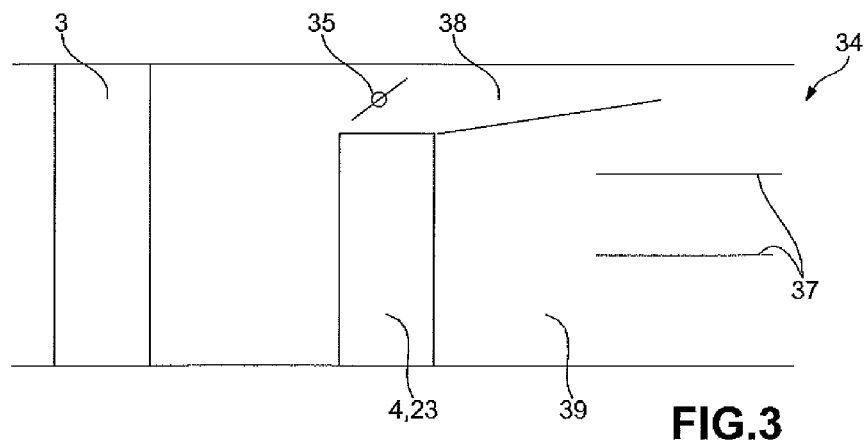
FIG. 3 is a schematic representation of an air channel according to an embodiment of the present invention, the air channel shown including an evaporator for cooling an air, a heat exchanger for heating the air, and stratification door.

In FIG. 3, an air channel 34 for directing the air to be supplied to the passenger compartment with the evaporator 3 of the refrigerant circuit 31 for cooling and/or dehumidifying the air and the heat exchanger 4, 23 for heating the air, is shown. Preferably, the heat exchanger 4, 23 is designed as a cross-counterflow heat exchanger.

The air mass flow cooled and/or dehumidified in the evaporator 3 is divided into two partial air mass flows using a stratification door 35. One of the partial air mass flows is directed inside the main flow passage 39 through the heat exchanger 4, 23 and heated. At the same time, the second partial air mass flow flows over a bypass 38 past the heat exchanger 4, 23. The stratification door 35 controls the partial air mass flow through the bypass 38.

A portion of the partial air mass flow heated in the heat exchanger 4, 23 is mixed with the cold air mass flow that is directed over the bypass 38 past the heat exchanger 4, 23, in order to reach a required target temperature of the air, whereas the other portion of the heated partial air mass flow remains unchanged. Only a small mass flow of cold air is needed because little temperature stratification is required.

Next to the layer that consists of the unmixed portion of the heated partial air mass flow, either one or two further layers are formed. If one further layer is formed, the whole cold partial air mass flow that has passed through the bypass 38 is mixed with a portion of the heated partial air mass flow. If two further layers are formed, only a portion of the cold partial air mass flow is mixed with a portion of the heated partial air mass flow. The other portion of the cold partial air mass flow flows unchanged as additional layer of the total flow through the air channel 34.

The total flow of the conditioned air is conducted in the air channel 34 in a stratified condition with help of a plurality of air guide members 37 and supplied to the outlets into the passenger compartment. The stratification of the air makes possible a specifically stratified temperature in the passenger compartment with warm footwell and cooler headspace, which is important for the comfort of the vehicle's passengers.

When the heat exchanger 4 is used as a condenser of the refrigerant circuit 31, the temperature of the air is further controlled over the heat pump system, e.g. the rotational speed of the compressor 5. No additional system of temperature doors in the air channel 34 is necessary. Stratification is only adjusted with the stratification door 35 in the bypass 38 past the condenser 4.

Figure 4A:
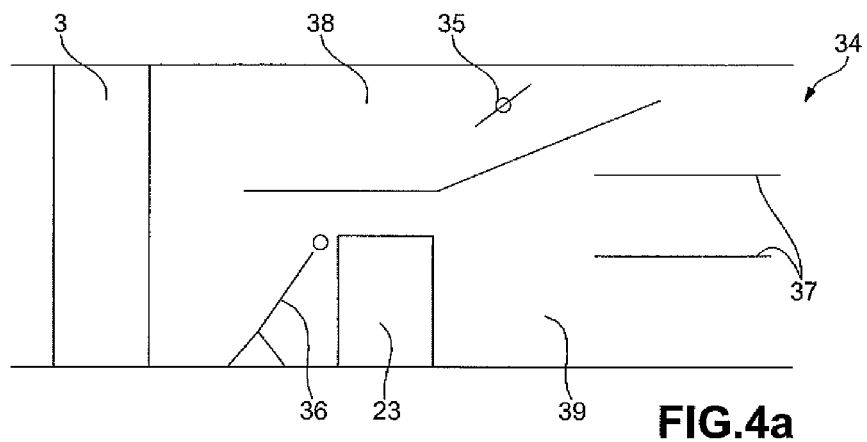
FIG. 4a is a schematic representation of the air channel of FIG. 4, the air channel shown with a temperature door positioned upstream of the heating heat exchanger for heating the air, the temperature door in a "fully cold" end position.
Figure 4B:
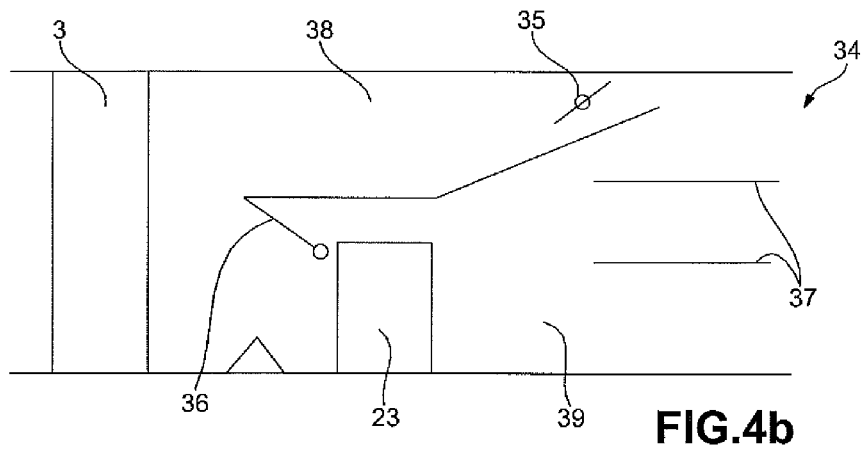
FIG. 4b is a schematic representation of the air channel of FIG. 4, the air channel shown with a temperature door positioned upstream of the heating heat exchanger for heating the air, the temperature door in a "fully warm" end position.

FIGS. 4a and 4b show the air channel 34 with evaporator 3 of the refrigerant circuit 31 for cooling and/or dehumidifying the air and the heating heat exchanger 23 of the coolant circuit 32 for heating the air. In a direction of flow of the air upstream of the heating heat exchanger 23 inside the main flow passage 39, a temperature door 36 is disposed.

As in the system of FIG. 3, the air mass flow cooled and/or dehumidifyed in the evaporator 3 is split into two partial air mass flows using the stratification door 35. Here, one partial air mass flow flows past the heating heat exchanger 23 over the bypass 38. The second partial air mass flow is passed through either inside the main flow passage 39 through the heating heat exchanger 23 and possibly heated or also directed to bypass the heating heat exchanger 23. The stratification door 35 controls the partial air mass flow through the bypass 38, the temperature door 36 controls the partial air mass flow at the heating heat exchanger 23.

Preferably, the temperature door 36 is exclusively operated in the end positions "fully cold", as shown in FIG. 4a, or "fully warm", as shown in FIG. 4b.

If operation is in the position "fully cold" of the temperature door 36, the whole partial air mass flow, that has not already been directed through the bypass 38 and the stratification door 35 past the heating heat exchanger 23, flows past the heating heat exchanger 23. Thus, no portion of the whole air mass flow passes through the heating heat exchanger 23. In such operational conditions no auxiliary heating, that means no supply of additional heat in the auxiliary heater 21 to the coolant, is needed. In case of prevailing high temperatures the switch-off valve 22 with the bypass 30 in the coolant circuit 32 can be dispensed with.

If operation is in the position "fully warm" of the temperature door 36, the whole partial air mass flow, that has not been directed through the bypass 38, flows through the heating heat exchanger 23 and is heated. In the position "fully warm" of the temperature door 36 the stratification door 35 is to be adjusted such that the required temperature stratification is achieved.

As in the system of FIG. 3, a portion of the partial air mass flow heated in the heating heat exchanger 23 is mixed with at least a portion of the cold air mass flow passing the bypass 38, whereby the other portion of the heated partial air mass flow remains unchanged. If not, the whole cold partial air mass flow, that has passed through the bypass 38, is mixed with a portion of the warm partial air mass flow, an additional cold layer is maintained in the total air flow. The total air flow consisting of cold air, mixed cold and warm air, and warm air, is then directed and stratified by means of the air guide members 37 in the air channel 34 to the outlets.

The temperatures required for the air conditioning of the passenger compartment, or the temperature stratification of the air, respectively, are measured, evaluated using a control unit and controlled over the auxiliary heater 21 and the switch-off valves 19, 22, or the partial air mass flows past the radiator 18 and/or the heating heat exchanger 23, or the rotational speed of the compressor 5. The temperature stratification in connection with the required temperatures is further realized by means of the temperature door 36 and the stratification door 35, whereby the temperature door 36 in the end position "fully cold" serves to isolate the partial air mass flow to be heated and avoid auxiliary heating effects.

From the foregoing description, one ordinarily skilled in the art can easily ascertain the essential characteristics of this invention and, without departing from the spirit and scope thereof, make various changes and modifications to the invention to adapt it to various usages and conditions.

NOMENCLATURE

1 HVAC system
2 heat exchanger, condenser
3 heat exchanger, evaporator
4 heat exchanger, condenser
5 compressor
6 tapping point
7 entering point
8 heat exchanger, evaporator, chiller
9 inner heat exchanger
10 expansion device
11 expansion device
12 expansion device
13 tapping point
14 entering point
15 first section of the secondary passage
16 second section of the secondary passage
17 heat exchanger, engine radiator
18 heat exchanger, radiator
19 switch-off valve, control valve
20 pump
21 heat exchanger, auxiliary heater
22 switch-off valve, control valve
23 heating heat exchanger, engine coolant circuit
24 heat exchanger (inverter)
25 heat exchanger, battery coolant circuit
26 heat exchanger, auxiliary heater
27 heat exchanger, battery cooler
28 pump
29 bypass
30 bypass
31 coolant circuit
32 coolant circuit engine
33 coolant circuit battery
34 air channel
35 stratification door
36 temperature door
37 air guide member
38 bypass
39 main flow passage

The invention claimed is:

1. A method for operating an HVAC system for conditioning air for a passenger compartment of a vehicle, the method comprising the steps of:
adjusting a heating temperature of a heat exchanger disposed in a first flow passage;
directing a first partial air mass flow through the first flow passage;
directing a second partial air mass flow through a second flow passage by means of a position of a stratification door, the second flow passage bypassing the heat exchanger; and
directing the first partial air mass flow and the second partial air mass flow by means of an air guide member as total flow with stratified composition, the air guide member disposed downstream of the first flow passage and the second flow passage, wherein the heating temperature of the heat exchanger required to at least one of achieve and maintain a desired climate in the passenger compartment of the vehicle is set as a maximum heating temperature for the heat exchanger, and wherein only an amount of energy required to at least one of achieve and maintain a desired climate in the passenger compartment of the vehicle is added to the HVAC system, wherein the first partial air mass flow is directed through the heat exchanger and is heated in the heat exchanger, and wherein the heat exchanger is a media-passed heating heat exchanger of a closed coolant circuit, and wherein the closed coolant circuit includes an auxiliary heater and a radiator with a bypass and a control valve, and wherein a temperature of a heating medium that passes the heating heat exchanger is controlled inside the closed coolant circuit by at least one of a heat delivered to the heating medium in the auxiliary heater and a heat dissipated from the heating medium in the radiator.

2. The method according to claim 1, further comprising the step of at least one of cooling and dehumidifying at least one of the first partial air mass flow and the second partial air mass flow in an evaporator of a refrigerant circuit.

3. The method according to claim 1, wherein the heat exchanger is an electrically operated heat exchanger.

4. The method according to claim 1, wherein a heat removal in the radiator is controlled by dividing a mass flow of the heating medium through the bypass and the radiator by means of the control valve.

5. The method according to claim 1, further comprising the steps of:
 determining a state variable of an air in the passenger compartment of the vehicle;
 determining a state variable of an air passing through at least one of the first flow passage and the second flow passage;
 evaluating at least one of the state variable of the air in the passenger compartment and the state variable of the air passing through at least one of the first flow passage and the second flow passage; and
 controlling at least one of a heat transfer to the heating medium in the auxiliary heater, a position of the control valve of the radiator, and a position of the stratification door in response to the step of evaluating at least one of the state variable of the air in the passenger compartment and the state variable of the air passing through at least one of the first flow passage and the second flow passage.

6. The method according to claim 1, wherein the heat exchanger includes a control valve and a bypass past the heat exchanger, and wherein a heat dissipated from the heating medium to the first partial air flow is controlled by dividing a mass flow of the heating medium through the bypass and through the heating heat exchanger by means of the control valve.

7. The method according to claim 6, further comprising the steps of:
 determining a state variable of an air in the passenger compartment of the vehicle;
 determining a state variable of an air passing through at least one of the first flow passage and the second flow passage;
 evaluating at least one of the state variable of the air in the passenger compartment and the state variable of the air passing through at least one of the first flow passage and the second flow passage; and
 controlling at least one of a heat transfer to the heating medium in the auxiliary heater, a position of the control valve of the heat exchanger, and a position of the stratification door in response to the step of evaluating at least one of the state variable of the air in the passenger compartment and the state variable of the air passing through at least one of the first flow passage and the second flow passage.

8. The method according to claim 1, wherein the first partial air mass flow is directed through the heat exchanger by means of a position of a temperature door, and wherein the temperature door is disposed in the first flow passage.

9. The method according to claim 8, wherein the temperature door is operated only in one of a "full cold" end position and a "fully warm" end position, whereby in the "fully cold" end position the first partial air mass flow is directed to bypass the heating heat exchanger and in the "fully warm" end position the first partial air mass flow is directed through the heating heat exchanger.

10. The method according to claim 1, wherein the first partial air mass flow is directed through the heat exchanger and heated in the heat exchanger, with the heat exchanger established as a media-passed condenser of a closed refrigerant circuit.

11. The method according to claim 10, further comprising the steps of:
 determining a state variable of an air in the passenger compartment of the vehicle;
 determining a state variable of an air passing through at least one of the first flow passage and the second flow passage;
 evaluating at least one of the state variable of the air in the passenger compartment and the state variable of the air passing through at least one of the first flow passage and the second flow passage; and
 controlling at least one of a rotational speed of a compressor of the closed refrigerant circuit and a position of the stratification door in response to the step of evaluating at least one of the state variable of the air in the passenger compartment and the state variable of the air passing through at least one of the first flow passage and the second flow passage.

12. The method according to claim 1, wherein each of the first partial air mass flow and the second partial air mass flow are partially mixed, whereby the second partial air mass flow is mixed with a portion of the partial air mass to form a total flow of air with stratified composition by means of the air guide member.

13. A method for operating an HVAC system for conditioning air for a passenger compartment of a vehicle inside an air channel having a main flow passage and a bypass with a stratification door, comprising the steps:
 adjusting a heating temperature of a heat exchanger disposed in the main flow passage of the air channel;
 directing a first partial air mass flow through the main flow passage of the air channel;
 directing a second partial air mass flow through the bypass of the air channel by means of a position of the stratification door, the second flow passage bypassing the heat exchanger; and
 directing the first partial air mass flow and the second partial air mass flow by means of a plurality of air guide members, the air guide members disposed downstream of the main flow passage and the bypass, wherein the heating temperature of the heat exchanger required to at least one of achieve and maintain a desired climate in the passenger compartment of the vehicle is set as a maximum heating temperature for the heat exchanger, and wherein only an amount of energy required to at least one of achieve and maintain a desired climate in the passenger compartment of the vehicle is added to the HVAC system, wherein the first partial air mass flow is directed through the heat exchanger and is heated in the heat exchanger, and wherein the heat exchanger is a media-passed heating heat exchanger of a closed coolant circuit, and wherein the closed coolant circuit includes an auxiliary heater and a radiator with a bypass and a control valve, and wherein a temperature of a heating medium that passes the heating heat exchanger is controlled inside the closed coolant circuit by at least one of a heat delivered to the heating medium in the auxiliary heater and a heat dissipated from the heating medium in the radiator.

14. The method according to claim 13, wherein the heat exchanger includes a control valve and a bypass past the heat exchanger, and wherein a heat dissipated from the heating medium to the first partial air flow is controlled by dividing a mass flow of the heating medium through the bypass and through the heating heat exchanger by means of the control valve.

15. A method for operating an HVAC system for conditioning air for a passenger compartment of a vehicle inside an air channel having a main flow passage and a bypass with a stratification door, comprising the steps:

adjusting a heating temperature of a heat exchanger disposed in the main flow passage of the air channel;

directing a first partial air mass flow through the main flow passage of the air channel, wherein the first partial air mass flow is directed through the heat exchanger and is heated in the heat exchanger, and wherein the heat exchanger is a media-passed heating heat exchanger of a closed coolant circuit;

directing a second partial air mass flow through the bypass of the air channel by means of a position of the stratification door, the second flow passage bypassing the heat exchanger;

directing the first partial air mass flow and the second partial air mass flow by means of a plurality of air guide members, the air guide members disposed downstream of the main flow passage and the bypass, wherein the heating temperature of the heat exchanger required to at least one of achieve and maintain a desired climate in the passenger compartment of the vehicle is set as a maximum heating temperature for the heat exchanger;

determining a state variable of an air in the passenger compartment of the vehicle; and determining a state variable of an air passing through the air channel; and controlling a position of the stratification door in response to an evaluation of at least one of the state variable of the air in the passenger compartment and the state variable of the air passing through the air channel, wherein the first partial air mass flow is directed through the heat exchanger and is heated in the heat exchanger, and wherein the heat exchanger is a media-passed heating heat exchanger of a closed coolant circuit, and wherein the closed coolant circuit includes an auxiliary heater and a radiator with a bypass and a control valve and wherein a temperature of a heating medium that passes the heating heat exchanger is controlled inside the closed coolant circuit by at least one of a heat delivered to the heating medium in the auxiliary heater and a heat dissipated from the heating medium in the radiator.

\* \* \* \* \*